United States Patent [19]

Terakawa

[11] Patent Number: 5,500,455
[45] Date of Patent: Mar. 19, 1996

[54] CORRECTION FLUID COMPOSITION CONTAINING ACRYLIC RESIN

[75] Inventor: Yukio Terakawa, Maebashi, Japan

[73] Assignee: Mitsubishi Pencil Kabushiki Kaisha, Tokyo, Japan

[21] Appl. No.: 196,246

[22] PCT Filed: Jun. 16, 1993

[86] PCT No.: PCT/JP93/00806

§ 371 Date: Feb. 17, 1994

§ 102(e) Date: Feb. 17, 1994

[87] PCT Pub. No.: WO93/25626

PCT Pub. Date: Dec. 23, 1993

[30] Foreign Application Priority Data

Jun. 17, 1992 [JP] Japan .................................. 4-181551
Jun. 8, 1993 [JP] Japan .................................. 5-137744

[51] Int. Cl.$^6$ ................................................ C09D 10/00
[52] U.S. Cl. ............................................ 523/161; 524/431
[58] Field of Search ............................ 523/161; 524/431

[56] References Cited

U.S. PATENT DOCUMENTS 4,654,081  3/1987  Dalzell ........................ 106/23
4,773,913  9/1988  Krieg .......................... 8/552

FOREIGN PATENT DOCUMENTS 61-19674   1/1986  Japan .
61-36552   8/1986  Japan .
1-59303   12/1989  Japan .
2-263876  10/1990  Japan .
3-95280    4/1991  Japan .

OTHER PUBLICATIONS

Database WPI, Section Ch, Week 9003, Derwent Publications Ltd., London, GB; Class A84, AN 84–123509 & JP–B–1 059 308 (Pentel KK (Goou) Goo Kagaku Kogyo KK) 15 Dec. 1989 *abstract*.

*Primary Examiner*—Christopher Henderson
*Attorney, Agent, or Firm*—Darby & Darby

[57] ABSTRACT

A correction fluid composition of the present invention comprises an acrylic synthetic resin obtained by copolymerizing 93 to 99.6% by weight of a (meth)acrylate represented by the formula (I)

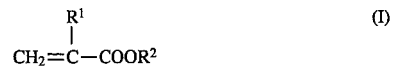

(wherein $R^1$ is hydrogen or a methyl group, and $R^2$ is an aliphatic hydrocarbon group, a cyclic aliphatic hydrocarbon group or a partially aromatic group-substituted aliphatic hydrocarbon group having 1 to 18 carbon atoms)

and not less than 0.4% by weight to less than 2% by weight of a basic nitrogen-containing monomer represented by the formula (II)

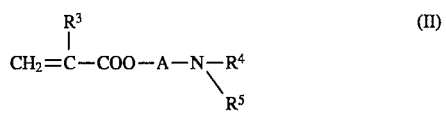

(wherein $R^3$ is hydrogen or a methyl group; each of $R^4$ and $R^5$ is independently a methyl group or an ethyl group; and A is an alkylene group having 1 to 4 carbon atoms) and if necessary, 5% by weight or less of a styrene monomer; a pigment containing titanium dioxide as the main component; and a non-polar solvent.

The correction fluid composition of the present invention is excellent in dispersion stability of titanium dioxide which is a pigment having high contrast properties for a long period of time, and by the use of this composition, an original white clean correction film of the amphibious type correction fluid can be obtained.

7 Claims, No Drawings

CORRECTION FLUID COMPOSITION CONTAINING ACRYLIC RESIN

TECHNICAL FIELD

The present invention relates to a correction fluid composition which is used to erase letters written in an aqueous ink, letters written in an oily ink, typed letters, images (PPC lines) copied by a dry duplicator, or the like for the sake of the correction of the drawn letters or lines.

BACKGROUND ART

Letters or lines drawn with a ballpoint pen, a fountain pen, a felt-tip pen, a typewriter or a dry duplicator cannot be erased with an eraser. Heretofore, in order to erase the written lines and copied lines which cannot be erased with an eraser for the sake of the correction of the drawn letters and lines, a highly concealable white liquid which is usually called a correction has been mainly used.

For the correction of the letters of an aqueous ink written with a fountain pen or an aqueous ballpoint pen, an oily correction fluid has been used, and for the correction of the letters of an oily ink written with an oily ballpoint pen or an oily felt-tip pen, an aqueous correction fluid has been used. In recent years, a correction fluid called an amphibious type or a common type which can be applied to correct the letters of both the oily and aqueous inks is getting the mainstream.

In this correction fluid called the amphibious type or the common type, a synthetic resin such as an acrylic resin, a petroleum resin, a chlorinated polyolefin resin or a synthetic rubber is usually used as a resin for forming a correction film.

However, most of the above-mentioned synthetic resins have a film-forming ability, but they are poor in dispersion stability (wettability, dispersibility and anti-settling properties) of a pigment such as titanium dioxide and also have poor solubility in a non-polar solvent. Thus, under the existing circumstances, there has been no synthetic resin desirable to use together with the non-polar solvent.

In the amphibious type correction fluid which is now on the market, a suitable amount of a solvent having large polarity is employed in addition to the non-polar solvent in order to increase the solubility of a synthetic resin used in the correction fluid, for example, an acrylic resin, a petroleum resin or a chlorine-based resin, and examples of the solvent having the large polarity include a chlorine-based solvent such as 1,1,1-trichloroethane, aromatic solvents such as toluene and xylene, acetate solvents such as ethyl acetate and butyl acetate, and ketone solvents such as methyl ethyl ketone and methyl isobutyl ketone (refer to Japanese Patent Publication No. (Sho) 61-36552 and Japanese Patent Application Laid-open Nos. (Sho) 61-19674 and (Hei) 3-95280).

Therefore, if the amphibious type correction fluid is applied onto a toner image copied by a dry duplicator or a line drawn with an oily ballpoint pen, a dye or a black toner is dissolved in the correction fluid, so that a correction film is often soiled.

DISCLOSURE OF THE INVENTION

SUMMARY OF THE INVENTION

A non-polar solvent is much less poisonous as compared with other solvents, but a binder and a synthetic resin such as a resin for the dispersion of a pigment which are usually used in a correction fluid are sparingly soluble in the non-polar solvent. For this reason, in the correction fluid using the non-polar solvent, the resin tends to separate from the solvent with time, which easily gives rise to fatal problems of the correction fluid such as failures of the correction film (the delamination of the film at the restart of writing and the occurrence of cracks in the film), and the deterioration of shelf stability due to the poor dispersion of the pigment (a viscosity increase phenomenon and the change of the deposited pigment into a hard cake).

An object of the present invention is to solve the above-mentioned problems, i.e., to provide a correction fluid composition which is excellent in shelf stability and which can form a correction film having good stability and giving no contamination.

In view of the above-mentioned situations, the present inventors have intensively conducted research, and as a result, an acrylic synthetic resin having a specific composition obtained by copolymerization is particularly excellent in solubility in the above-mentioned non-polar solvent. By the utilization of this acrylic synthetic resin, it has been successfully made to obtain a correction fluid composition which is excellent in shelf stability and which can form a correction film having good stability and giving no contamination, and in consequence, a correction fluid composition of the present invention has been completed.

That is, a correction fluid composition of the present invention is characterized by comprising an acrylic synthetic resin obtained by copolymerizing 93 to 99.6% by weight of a (meth)acrylate represented by the formula (I)

(wherein $R^1$ is hydrogen or a methyl group, and $R^2$ is an aliphatic hydrocarbon group, a cyclic aliphatic hydrocarbon group or a partially aromatic group-substituted aliphatic hydrocarbon group having 1 to 18 carbon atoms) and not less than 0.4% by weight to less than 2% by weight of a basic nitrogen-containing monomer represented by the formula (II)

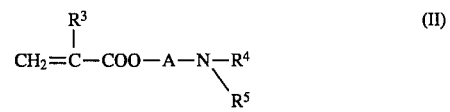

(wherein $R^3$ is hydrogen or a methyl group; each of $R^4$ and $R^5$ is independently a methyl group or an ethyl group; and A is an alkylene group having 1 to 4 carbon atoms) and if necessary, 5% by weight or less of a styrene monomer; a pigment containing titanium dioxide as the main component; and a non-polar solvent.

Preferably, the correction fluid composition of the present invention comprises 5 to 15% by weight of the acrylic synthetic resin, 40 to 60% by weight of the pigment, and 25 to 55% by weight of a non-polar solvent containing 50% by weight or less of n-heptane, 2,2,4-trimethylpentane or a mixture of n-heptane and 2,2,4-trimethylpentane.

DETAILED DESCRIPTION OF THE INVENTION

Examples of a (meth)acrylate represented by the formula (I) which can be used to obtain an acrylic synthetic resin of a correction fluid composition of the present invention include acrylates such as methyl acrylate, ethyl acrylate, propyl acrylate, isopropyl acrylate, isobutyl acrylate, n-butyl acrylate, 2-ethylhexyl acrylate, octyl acrylate, lauryl acrylate, cetyl acrylate, stearyl acrylate, oleyl acrylate cyclohexyl acrylate and the like; and methacrylates such as methyl methacrylate, ethyl methacrylate, propyl methacrylate, isopropyl methacrylate, isobutyl methacrylate, n-butyl methacrylate, 2-ethylhexyl methacrylate, octyl methacrylate, lauryl methacrylate, cetyl methacrylate, stearyl methacrylate, oleyl methacrylate cyclohexyl methacrylate and the like. These (meth)acrylates may be used singly or in combination, depending upon a correction film performance and a pigment dispersion performance. Particularly preferable is a combination of at least one monomer selected from the group consisting of n-butyl methacylate, isobutyl methacrylate and ethyl methacrylate and at least one monomer selected from the group consisting of lauryl methacrylate, n-butyl acrylate and 2-ethylhexyl methacrylate.

The (meth)acrylate represented by the formula (I) is required to be present in the range of from 93 to 99.6% by weight as a copolymerizable component of the acrylic synthetic resin. If the content of the (meth)acrylate is less than 93% by weight, the solubility of the acrylic synthetic resin in the non-polar solvent is poor and an obtained correction film is fragile. If it is more than 99.6% by weight, the dispersion stability is conversely poor. Examples of the basic nitrogen-containing monomer represented by the formula (II) which can be used to obtain the acrylic synthetic resin in the correction fluid composition of the present invention include N,N-dimethylaminoethyl methacrylate, N,N-dimethylaminoethyl acrylate, N,N-diethylaminoethyl methacrylate, N,N-diethylaminoethyl acrylate and the like. From the viewpoint of pigment dispersion properties and viscosity stability, N,N-dimethylaminoethyl methacrylate and N,N-diethylaminoethyl methacrylate are preferable.

The basic nitrogen-containing monomer represented by the formula (II) is required to be present in the range of not less than 0.4% by weight to less than 2.0% by weight as the copolymerizable component of the acrylic synthetic resin. If the content of the basic nitrogen-containing monomer is less than 0.4% by weight, the amount of the titanium dioxide pigment which is adsorbed by the resin decreases, and in particular, the dispersion stability of the pigment tends to decline over a long period of time.

Furthermore, if the content of the basic nitrogen-containing monomer is 2.0% by weight or more, the solubility of the acrylic synthetic resin itself in the non-polar organic solvent tends conversely to decline, so that the acrylic synthetic resin varnish itself is liable to bring about phase separation during storage.

As a result, the resin easily separates from the solvent with time, so that there easily occur fatal problems of the correction fluid such as the deterioration of shelf stability due to the poor dispersion of the pigment in the correction fluid (viscosity increase and a pigment settling phenomenon) and failures of the correction film (the delamination of the film at the restart of writing and the occurrence of cracks in the dry film).

These problems are attributed to the fact that the basic nitrogen-containing monomer is originally hydrophilic, and it can be supposed that the solubility of the acrylic synthetic resin itself in the non-polar solvent naturally declines, as the content of the monomer increases.

If necessary, less than 5% by weight of a styrene monomer may be added as a copolymerizable component to the acrylic synthetic resin which is used in the correction fluid composition of the present invention.

The copolymerization of this styrene monomer permits obtaining the film having a close surface layer and flexibility. However, if the content of the styrene monomer is 5% by weight or more, the solubility of the acrylic synthetic resin in the non-polar solvent declines, and the obtained correction film is brittle, so that a trouble occurs at the time of rewriting. The acrylic synthetic resin which is used in the correction fluid composition of the present invention is soluble in the solvent, has a performance as a dispersion resin for titanium dioxide or another pigment to be filled, and exerts a proper performance as the correction film.

The amount of the acrylic synthetic resin is in the range of from 5 to 15% by weight, preferably from 7 to 13% by weight based on the weight of the composition. If the amount of the acrylic synthetic resin is 5% by weight or less, the dispersion failure of the pigment occurs, and the obtained correction film is very brittle, so that some cracks occur and the film tends to delaminate at the time of the writing on the correction film, i.e., the rewriting. If it is 15% by weight or more, the film is conversely liable to be viscous, which deteriorates a rewriting performance and increases the viscosity of the correction fluid, so that the smooth film cannot be obtained any more.

The acrylic synthetic resin which is used in the correction fluid composition of the present invention can be prepared by a conventional known solution polymerization process.

In this case, the preferable molecular weight of the acrylic synthetic resin is in the range of from 30,000 to 200,000. If the molecular weight of the acrylic synthetic resin is 30,000 or less, the correction film is liable to be viscous, which deteriorates the rewriting performance. Conversely, if it is more than 200,000, the viscosity of the correction fluid increases, so that the fluidity of the correction fluid declines and a coating performance noticeably deteriorates. Particularly considering the proper film performance and the correction fluid viscosity, the molecular weight of the acrylic synthetic resin is preferably in the range of from 60,000 to 150,000.

With regard to the pigment which can be used in the correction fluid composition of the present invention, rutile type or anatase type titanium dioxide can be used as an essential component.

Typical examples of the usable rutile type titanium dioxide include R-780, R-820, CR-50 and CR-93 made by ISHIHARA SANGYO KAISHA LTD.; R-900 and R-931 made by Du Pont; JR-701, JR-600, JR-801 and JRNC made by TAYCA CORPORATION; KR-380, KR-380N and KR-460 made by Titan Kogyo Kabushiki Kaisha; and the like. In addition, typical examples of the usable anatase type titanium dioxide include A-100 and A-220 made by ISHIHARA SANGYO KAISHA LTD.; JA-3 and JA-5 made by TAYCA CORPORATION; KA-10 and KA-20 made by Sakai Chemical Industry Co., Ltd; and the like.

As a pigment other than titanium dioxide, if necessary, fine silica powder, calcium carbonate, talc, clay, aluminum silicate powder and the like can be used in a suitable combination, but in this case, from the viewpoint of concealing properties, the amount of the other pigment is preferably 30% or less based on the weight of titanium dioxide.

No particular restriction is put on the kind of non-polar solvent which can be used in the correction fluid composition of the present invention, so long as it gives a proper drying velocity as the correction fluid, dissolves the acrylic synthetic resin, and scarcely dissolves/blurs a coloring component such as an aqueous ink, an oily ink, a PPC toner or a heat transfer ribbon. Nevertheless, examples of the usable main solvent include cycloparaffin-based solvents such as cyclohexane, methylcyclohexane, ethylcyclohexane and the like; paraffin-based solvents such as n-heptane, 3-methylpentane, 2,2,4-trimethylpentane; and cyclopentane-based solvents such as methylcyclopentane, ethylcyclopentane and the like. They may be used singly or in the form of a mixture thereof. It is particularly preferable to use n-heptane and/or 2,2,4-trimethylpentane in an amount of 50% by weight or less, preferably 5 to 50% by weight based on the weight of the total solvent. This is very effective to prevent the ink of an under print/a written line from dissolving at the time of the formation of the correction fluid film. In addition, when this constitution is employed, there can be improved the solubility of the acrylic synthetic resin of the present invention, the dispersion stability of the pigment mainly comprising titanium dioxide, and the shelf stability of the correction fluid composition.

In the correction fluid composition of the present invention, an oily dispersant for the dispersion of titanium dioxide, a filler pigment and a coloring pigment can be used, if necessary. For example, in an anionic system, a polycarboxylic acid-based dispersant can be used; in a cationic system, a long-chain amine-based dispersant can be used; and in a nonionic system, a polyether-based dispersant can be used. Furthermore, examples of a commercially available titanate coupling agent include Titacoat S-151, S-152 and the like made by Nippon Soda Co., Ltd., and other examples of the oily dispersant include Disperbyk-160, Lactimon and the like made by Big Chemie Co., Ltd.; Solsperse #3000, #9000, #24000 and the like made by ICI; Antigel and the like made by Schwegmann Co., Ltd.

In the correction fluid composition of the present invention, there may be used, if necessary, conventionally known anti-settling agent, viscosity modifier, polymerization inhibitor, anti-skinning agent, coloring pigment and the like in addition to the above-mentioned components.

The correction fluid composition of the present invention can be obtained by mixing and dispersing the above-mentioned components by means of a mixing/dispersing machine such as a bead mill, an attritor, a ball mill, a sand grinder and the like.

The correction fluid composition of the present invention is excellent in the dispersion stability of the pigment mainly comprising titanium dioxide, shelf stability and a correction film performance, and this film is protected from contamination with the ink of written lines, so that the clean white correction film can be formed.

This reason is considered to be that the acrylic synthetic resin peculiar to the present invention in the composition is well soluble in the non-polar solvent without using a polar solvent, whereby the dispersion properties of the pigment are improved and so the shelf stability and the correction film performance of the correction fluid composition are also improved. Furthermore, since the non-polar solvent is used in place of the polar solvent and the above-mentioned excellent correction film is formed, a dye, a wax and a resin used in an ink of various written letters and drawn lines are not dissolved in the correction film. Therefore, the film is not soiled, so that the white clean correction film can be obtained.

BEST MODE FOR CARRYING OUT THE INVENTION

EXAMPLES

Now, a correction fluid composition of the present invention will be described in reference to examples. In this connection, amounts of components to be blended in the examples will be all represented by "part(s) by weight".

Acrylic synthetic resins which were used in examples and comparative examples were prepared as follows:

(1) Preparation of an acrylic synthetic resin solution (A1):
(The solution was used in Examples 1 and 4, and Comparative Example 13.)

In a 800 ml reaction vessel equipped with a thermometer, a mixing stirrer, a heating jacket and a reflux condenser were placed 47 parts of iso-butyl methacrylate, 47 parts of butyl acrylate, 4.5 parts of styrene, 0.6 part of N,N-dimethylaminoethyl methacrylate and 150 parts of methylcyclohexane. Afterward, 1 part of azobisisobutyronitrile was added thereto as a polymerization initiator, and solution polymerization was carried out at 80° C. for 7 hours under a nitrogen gas stream to obtain an acrylic synthetic resin solution having a resin concentration of about 40%.

(2) Preparation of an acrylic synthetic resin solution (A2):
(The solution was used in Example 2.)

In the same reaction vessel as described above were placed 56 parts of iso-butyl methacrylate, 42 parts of butyl acrylate, 2 parts of styrene and 1.0 part of N,N-diethylaminoethyl methacrylate and 150 parts of methylcyclohexane. Afterward, 1 part of azobisisobutyronitrile was added thereto as a polymerization initiator, and solution polymerization was carried out at 80° C. for 7 hours under a nitrogen gas stream to obtain an acrylic synthetic resin solution having a resin concentration of about 40%.

(3) Preparation of an acrylic synthetic resin solution (A3):
(The solution was used in Examples 3, 5 and 6, and Comparative Example 12.)

In the same reaction vessel as described above were placed 56 parts of n-butyl methacrylate, 14 parts of butyl acrylate, 28 parts of 2-ethylhexyl methacrylate and 1.8 parts of N,N-diethylaminoethyl methacrylate and 150 parts of ethylcyclohexane. Afterward, 1 part of azobisisobutyronitrile was added thereto as a polymerization initiator, and solution polymerization was carried out at 80° C. for 7 hours under a nitrogen gas stream to obtain an acrylic synthetic resin solution having a resin concentration of about 40%.

(4) Preparation of an acrylic synthetic resin solution (B1):
(The solution was used in Comparative Example 1.)

In the same reaction vessel as described above were placed 56 parts of isobutyl methacrylate, 42 parts of butyl acrylate, 2 parts of styrene and 150 parts of methylcyclohexane. Afterward, 1 part of azobisisobutyronitrile was added thereto as a polymerization initiator, and solution polymerization was carried out at 80° C. for 7 hours under a nitrogen gas stream to obtain an acrylic synthetic resin solution having a resin concentration of about 40%.

(5) Preparation of an acrylic synthetic resin solution (B2):
(The solution was used in Comparative Examples 2 and 10.)

In the same reaction vessel as described above were placed 56 parts of n-butyl methacrylate, 42 parts of 2-ethylhexyl methacrylate, 2 parts of styrene and 0.2 part of N,N-diethylaminoethyl methacrylate and 150 parts of methylcyclohexane. Afterward, 1 part of azobisisobutyronitrile was added thereto as a polymerization initiator, and solution polymerization was carried out at 80° C. for 7 hours under a nitrogen gas stream to obtain an acrylic synthetic resin solution having a resin concentration of about 40%.

(6) Preparation Of an acrylic synthetic resin solution (B3):
(The solution was used in Comparative Examples 3, 6 and 11.)

In the same reaction vessel as described above were placed 56 parts of n-butyl methacrylate, 28 parts of 2-ethylhexyl methacrylate, 13 parts of butyl acrylate and 3.0 part of N,N-diethylaminoethyl methacrylate and 150 parts of ethylcyclohexane. Afterward, 1 part of azobisisobutyronitrile was added thereto as a polymerization initiator, and solution polymerization was carried out at 80° C. for 7 hours under a nitrogen gas stream to obtain an acrylic synthetic resin solution having a resin concentration of about 40%.

(7) Preparation of an acrylic synthetic resin solution (B4): (The solution was used in Comparative Examples 4 and 7.)

In the same reaction vessel as described above were placed 47 parts of isobutyl methacrylate, 45 parts of butyl acrylate, 8.0 parts of N,N-diethylaminoethyl methacrylate and 150 parts of ethylcyclohexane. Afterward, 1 part of azobisisobutyronitrile was added thereto as a polymerization initiator, and solution polymerization was carried out at 80° C. for 7 hours under a nitrogen gas stream to obtain an acrylic synthetic resin solution having a resin concentration of about 40%.

(8) Preparation of an acrylic synthetic resin solution (B5): (The solution was used in Comparative Examples 5, 8 and 9.)

In the same reaction vessel as described above were placed 47 parts of n-butyl methacrylate, 32 parts of butyl acrylate, 1 part of styrene, 20 parts of N,N-diethylaminoethyl methacrylate and 150 parts of ethylcyclohexane. Afterward, 1 part of azobisisobutyronitrile was added thereto as a polymerization initiator, and solution polymerization was carried out at 80° C. for 7 hours under a nitrogen gas stream to obtain an acrylic synthetic resin solution having a resin concentration of about 40%.

For the correction fluid compositions obtained in the examples and the comparative examples, tests of the following items were carried out in accordance with 5. Test Method described in Correction Fluids, JIS S 6055-1988. (Performance Test Methods and Evaluation Standard of Correction Fluid Compositions)

(1) Dryness:

A correction fluid was applied onto a writing paper designated by JIS with a film applicator with 50 μm clearance, and a spiral line was then drawn with an oily ballpoint pen "SA-S Black" (made by Mitsubishi Pencil Co., Ltd.) to measure a time taken until writing could usually be done).

When the film drying time was 50 seconds or less, the drying properties were evaluated to be good.

(2) Reinscribability:

Writing was usually done on a test paper used in the above-mentioned test of the dryness with an aqueous ballpoint pen "Uniball UB-105 Black" (made by Mitsubishi Pencil Co., Ltd.) to inspect a writing performance and to observe whether color fading and bleeding were present or not. Evaluation was made on the basis of the following criteria:

○ ... A case that a film of a correction fluids was so smooth that writing could be smoothly carried out thereon.

Δ ... A case that the film was so slightly coarse to make writing bad.

x ... A case that the film was so coarse as to bring about noticeable color fading and bleeding of an ink.

(3) Peelability:

A test paper prepared by the same manner as in the above-mentioned test of the dryness properties was folded, and a weight of 500 g was put thereon in accordance with a JIS method. Afterward, the test piece was spread, and it was observed whether the peeling of a film was present or not. Evaluation was made on the basis of the following criteria:

○ ... A case that cracks and peeling of the film were not present.

Δ ... A case that some cracks were present in the film.

x ... A case that many cracks were present in the film and peeling was liable to occur.

(4) Smoothness of the film:

A glossiness of a correction fluid composition film used in a contrast ratio test was measured at an incidence/reflection angle of 60° by the use of a digital angle-changeable gloss meter (Suga Testing Machine Co., Ltd.).

When the glossiness was 50 or more, the smooth film having high dispersion properties could be obtained.

(5) Initial contrast ratio:

A correction fluid composition before a storage test was applied onto a contrast ratio testing paper (JIS K 5400) by means of a film applicator having a clearance of 50 μm, and after drying, a diffused reflective ratio was then measured by a color computer (Suga Testing Machine Co., Ltd.). Afterward, the initial contrast ratio was calculated in accordance with a predetermined equation.

When the initial contrast ratio was 90% or more, a drawn under line was not seen through, and contrast properties were evaluated to be good.

(6) Number of shaking operations and contrast ratio after shaking:

Each of correction fluid compositions obtained in the examples and the comparative examples was placed in a reservoir containing two shaking balls in a correction pen "CLP-8N" (Mitsubishi Pencil Co., Ltd.), and the correction pen was then upward allowed to stand for 3 months. Afterward, the composition was shaken again, and at this time, the number of the shaking operations till the generation of the hit sound of the shaking balls was counted. In addition, a contrast ratio after 20 shaking operations was measured as the contrast ratio after shaking.

When the number of the shaking operations was 10 or less, the dispersion performance of the correction fluid was evaluated to be good.

When the contrast ratio after shaking was scarcely different from the initial contrast ratio and it was 90% or more, the correction fluid composition was evaluated to be acceptable.

(7) Preservation state (50° C.)

300 ml of the correction fluid composition were placed in a mayonnaise bottle, and it was then still preserved at 50° C. for 3 months. Afterward, the state of sedimentation/separation was observed, and the state of the correction fluid composition was evaluated on the basis of the following criteria, while the sediment was stirred by a spatula:

○ ... A case where the state was good.

Δ ... A case where sedimentation/separation was slightly observed.

x ... A case where a large amount of a supernatant liquid was present, and the sediment was in the form of a hard cake.

(8) Contamination resistance:

An image copied by a dry coping machine "Ricoh FT-5840" (made by Ricoh Co., Ltd.) and a line drawn with an oily ballpoint pen "BA-45 Blue" (Mitsubishi Pencil Co., Ltd.) were corrected, and at this time, there were observed the dissolution and contamination states due to a toner of the copied image and a dye of the line drawn with the oily ballpoint pen. Evaluation was made on the basis of the following criteria:

Resistance to the contamination with PPC toner:

○ ... A case where a film of a correction fluids was not changed.

Δ . . . A case where the film was slightly blackened.

x . . . A case where the film was blackened.

Resistance to the contamination with the ink of the oily ballpoint pen:

○ . . . A case where the film was not changed.

x . . . A case where the film was discolored to blue.

Various correction fluid compositions were obtained by blending components in ratios shown in the following examples and comparative examples, and then mixing/dispersing them for 30 hours by a ball mill:

The results are shown in Table 1.

Example 1

| | |
|---|---|
| Titanium dioxide (JR-701, made by TAYCA CORPORATION) | 45.0 |
| Acrylic resin solution (A1) | 20.0 |
| Methylcyclohexane | 26.0 |
| 2,2,4-trimethylpentane | 8.2 |
| Oily dispersant (Titacoat S151, made by Nippon Soda Co., Ltd.) | 0.8 |

Example 2

| | |
|---|---|
| Titanium dioxide (JR-801, made by TAYCA CORPORATION) | 41.0 |
| Acrylic resin solution (A2) | 20.0 |
| Methylcyclohexane | 21.2 |
| n-heptane | 17.0 |
| Oily dispersant (Solsperse #9000, made by ICI) | 0.8 |

Example 3

| | |
|---|---|
| Titanium dioxide (R-780, (made by ISHIHARA SANGYO KAISHA LTD.) | 40.0 |
| Acrylic resin solution (A3) | 20.0 |
| Methylcyclohexane | 19.5 |
| n-heptane | 20.0 |
| Wet dispersant (Lactimon, made by BYK) | 0.5 |

Example 4

| | |
|---|---|
| Titanium dioxide (R-933, made by Du Pont) | 45.0 |
| Acrylic resin solution (A1) | 20.0 |
| Methylcyclohexane | 30.0 |
| Ethylcyclohexane | 4.2 |
| Oily dispersant (Titacoat S151, made by Nippon Soda Co., Ltd.) | 0.8 |

Example 5

| | |
|---|---|
| Titanium dioxide (JR-801, made by TAYCA CORPORATION) | 40.0 |
| Aluminum silicate (P-820, made by Degussa) | 2.0 |
| Acrylic resin solution (A3) | 20.0 |
| Methylcyclohexane | 30.0 |
| Ethylcyclohexane | 7.5 |
| Wet dispersant (Lactimon, made by BYK) | 0.5 |

Example 6

| | |
|---|---|
| Titanium dioxide (KR-380, made by Titan Kogyo Kabushiki Kaisha) | 40.0 |
| Aluminum silicate (P-820, made by Degussa) | 2.0 |
| Acrylic resin solution (A3) | 20.0 |
| Methylcyclohexane | 17.5 |
| n-heptane | 10.0 |
| 2,2,4-trimethylpentane | 10.0 |
| Wet dispersant (Lactimon, made by BYK) | 0.5 |

Comparative Example 1

| | |
|---|---|
| Titanium dioxide (R-933, made by Du Pont) | 45.0 |
| Acrylic resin solution (B1) | 20.0 |
| Methylcyclohexane | 30.0 |
| Ethylcyclohexane | 4.2 |
| Oily dispersant (Titacoat S151, made by Nippon Soda Co., Ltd.) | 0.8 |

Comparative Example 2

| | |
|---|---|
| Titanium dioxide (JR-801, made by TAYCA CORPORATION) | 45.0 |
| Acrylic resin solution (B2) | 20.0 |
| Methylcyclohexane | 30.0 |
| Ethylcyclohexane | 4.2 |
| Oily dispersant (Solsperse #9000, made by ICI) | 0.8 |

Comparative Example 3

| | |
|---|---|
| Titanium dioxide (R-820, made by ISHIHARA SANGYO KAISHA LTD.) | 45.0 |
| Acrylic resin solution (B3) | 20.0 |
| Methylcyclohexane | 34.2 |
| Oily dispersant (Solsperse #9000, made by ICI) | 0.8 |

Comparative Example 4

| | |
|---|---|
| Titanium dioxide (R-780, made by ISHIHARA SANGYO KAISHA LTD.) | 45.0 |
| Aluminum silicate (P-820, made by Degussa) | 2.0 |
| Acrylic resin solution (B4) | 20.0 |
| Methylcyclohexane | 32.2 |
| Oily dispersant (Solsperse #3000, made by ICI) | 0.8 |

Comparative Example 5

| | |
|---|---|
| Titanium dioxide (JR-801, made by TAYCA CORPORATION) | 40.0 |
| Aluminum silicate (P-820, made by Degussa) | 2.0 |
| Acrylic resin solution (B5) | 20.0 |
| Methylcyclohexane | 30.0 |
| Ethylcyclohexane | 7.5 |
| Wet dispersant (Lactimon, made by BYK) | 0.5 |

Comparative Example 6

| | |
|---|---|
| Titanium dioxide (KR-460, made by Titan Kogyo Kabushiki Kaisha) | 43.0 |
| Acrylic resin solution (B3) | 20.0 |
| Methylcyclohexane | 31.0 |
| 1,1,1-trichloroethane | 5.0 |
| Oily dispersant (Solsperse #3000, made by ICI) | 1.0 |

Comparative Example 7

| | |
|---|---|
| Titanium dioxide (JR-801, made by TAYCA CORPORATION) | 40.0 |
| Acrylic resin solution (B4) | 20.0 |
| Methylcyclohexane | 31.2 |
| 1,1,1-trichloroethane | 8.0 |
| Oily dispersant (Solsperse #9000, made by ICI) | 0.8 |

Comparative Example 8

| | |
|---|---|
| Titanium dioxide (KR-380, made by Titan Kogyo Kabushiki Kaisha) | 43.0 |
| Acrylic resin solution (B5) | 20.0 |
| Methylcyclohexane | 31.4 |
| 1,1,1-trichloroethane | 5.0 |
| Oily dispersant (Solsperse #9000, made by ICI) | 0.6 |

Comparative Example 9

| | |
|---|---|
| Titanium dioxide (JR-701, made by TAYCA CORPORATION) | 45.0 |
| Acrylic resin solution (B5) | 20.0 |
| Methylcyclohexane | 26.0 |
| n-heptane | 8.2 |
| Oily dispersant (Titacoat S151, made by Nippon Soda Co., Ltd.) | 0.8 |

Comparative Example 10

| | |
|---|---|
| Titanium dioxide (R-820, made by ISHIHARA SANGYO KAISHA LTD.) | 50.0 |
| Acrylic resin solution (B2) | 20.0 |
| Methylcyclohexane | 19.2 |
| n-heptane | 10.0 |
| Oily dispersant (Solsperse #3000, made by ICI) | 0.8 |

Comparative Example 11

| | |
|---|---|
| Titanium dioxide (KR-380, made by Titan Kogyo Kabushiki Kaisha) | 43.0 |
| Acrylic resin solution (B3) | 20.0 |
| Methylcyclohexane | 31.4 |
| 2,2,4-trimethylpentane | 5.0 |
| Oily dispersant (Solsperse #9000, made by ICI) | 0.6 |

Comparative Example 12

| | |
|---|---|
| Titanium dioxide (R-820, made by ISHIHARA SANGYO KAISHA LTD.) | 50.0 |
| Acrylic resin solution (A3) | 20.0 |
| Methylcyclohexane | 19.2 |
| Toluene | 5.0 |
| Ethyl acetate | 5.0 |
| Oily dispersant (Solsperse #3000, made by ICI) | 0.8 |

Comparative Example 13

| | |
|---|---|
| Titanium dioxide (KR-380, made by Titan Kogyo Kabushiki Kaisha) | 43.0 |
| Acrylic resin solution (A1) | 20.0 |
| Methylcyclohexane | 31.4 |
| 1,1,1-trichloroethane | 5.0 |
| Oily dispersant (Solsperse #9000, made by ICI) | 0.6 |

For the correction fluid compositions obtained in the examples and the comparative examples, the above-mentioned tests were carried out, and the obtained results are set forth in Table 1.

TABLE 1

| | Example No. | | | | | |
|---|---|---|---|---|---|---|
| | 1 | 2 | 3 | 4 | 5 | 6 |
| Amount of Basic Nitrogen-Containing Monomer (wt. %) | 0.6 | 1.0 | 1.8 | 0.6 | 1.8 | 1.8 |
| Wt. % of n-heptane/Trimethyl-pentane in Total Solvent | 17.7 | 33.9 | 38.8 | — | — | 40.4 |
| Performance Test of Correction Film | | | | | | |
| Dryness (sec.) | 38 | 39 | 39 | 45 | 43 | 40 |
| Reinscribability | O | O | O | O | O | O |
| Peelability | O | O | O | O | O | O |
| Smoothness | 65 | 55 | 54 | 55 | 58 | 61 |
| Shelf Stability of Fluid | | | | | | |
| Initial Contrast Ratio (%) | 93 | 94 | 94 | 96 | 94 | 93 |
| Number of Shaking Operations (times) | 5 | 5 | 5 | 5 | 7 | 5 |
| Contrast Ratio after Shaking (%) | 93 | 94 | 94 | 95 | 94 | 92 |

TABLE 1-continued

|  | | | | | | |
|---|---|---|---|---|---|---|
| Preservation State (50° C.) | ○ | ○ | ○ | ○ | ○ | ○ |
| PPC Contamination Resistance | ○ | ○ | ○ | Δ | Δ | ○ |
| Resistance to Contamination with Oily Ballpoint Pen | ○ | ○ | ○ | ○ | ○ | ○ |

|  | Comparative Example No. | | | | | |
|---|---|---|---|---|---|---|
|  | 1 | 2 | 3 | 4 | 5 | 6 |
| Amount of Basic Nitrogen-Containing Monomer (wt. %) | 0 | 0.2 | 3.0 | 8.0 | 20 | 3.0 |
| Wt. % of n-heptane/Trimethyl-pentane in Total Solvent | — | — | — | — | — | — |
| Performance Test of Correction Film | | | | | | |
| Dryness (sec.) | 45 | 44 | 45 | 48 | 44 | 39 |
| Reinscribability | X | Δ | Δ | Δ | Δ | ○ |
| Peelability | ○ | ○ | Δ | Δ | ○ | ○ |
| Smoothness | 8 | 18 | 20 | 18 | 9 | 59 |
| Shelf Stability of Fluid | | | | | | |
| Initial Contrast Ratio (%) | 96 | 94 | 92 | 95 | 94 | 91 |
| Number of Shaking Operations (times) | 95 | 62 | 12 | 58 | 42 | 15 |
| Contrast Ratio after Shaking (%) | 85 | 88 | 89 | 87 | 88 | 88 |
| Preservation State (50° C.) | X | X | Δ | X | X | ○ |
| PPC Contamination Resistance | Δ | Δ | Δ | Δ | Δ | X |
| Resistance to Contamination with Oily Ballpoint Pen | ○ | ○ | ○ | ○ | ○ | X |

|  | Comparative Example No. | | | | | | |
|---|---|---|---|---|---|---|---|
|  | 7 | 8 | 9 | 10 | 11 | 12 | 13 |
| Amount of Basic Nitrogen-Containing Monomer (wt. %) | 8.0 | 20 | 20 | 0.2 | 3.0 | 1.8 | 0.6 |
| Wt. % of n-heptane/Trimethyl-pentane in Total Solvent | — | — | 17.7 | 24.3 | 10.3 | — | 10.3 |
| Performance Test of Correction Film | | | | | | | |
| Dryness (sec.) | 38 | 38 | 38 | 34 | 39 | 40 | 54 |
| Reinscribability | ○ | ○ | ○ | X | X | ○ | ○ |
| Peelability | ○ | ○ | ○ | Δ | Δ | ○ | ○ |
| Smoothness | 54 | 58 | 14 | 10 | 14 | 48 | 57 |
| Shelf Stability of Fluid | | | | | | | |
| Initial Contrast Ratio (%) | 93 | 91 | 92 | 94 | 93 | 92 | 94 |
| Number of Shaking Operations (times) | 6 | 5 | 50 | 59 | 60 | 4 | 7 |
| Contrast Ratio after Shaking (%) | 91 | 91 | 87 | 90 | 89 | 92 | 93 |
| Preservation State (50° C.) | ○ | ○ | X | Δ | X | ○ | ○ |
| PPC Contamination Resistance | X | X | ○ | ○ | ○ | X | X |
| Resistance to Contamination with Oily Ballpoint Pen | X | X | ○ | ○ | ○ | X | X |

Possibility of Industrial Utilization

A correction fluid composition of the present invention is used to erase letters written in an aqueous ink, letters written in an oily ink, typed letters, images (PPC lines) copied by a dry duplicator, and the like for the sake of the correction of the drawn letters and lines.

In the correction fluid composition of the present invention, an acrylic copolymer synthetic resin containing a specific amount of basic nitrogen-containing monomer is used as an acrylic copolymer synthetic resin, and therefore the excellent dispersion stability of titanium dioxide which is a pigment having high contrast properties can be maintained for a long period of time. Furthermore, since a specific non-polar organic solvent is used, an original white clean correction film of the amphibious type correction fluid can be obtained.

I claim:

1. A correction fluid composition comprising:
   (a) an acrylic synthetic resin obtained by copolymerizing
   (i) 93 to 99.6% by weight of a (meth)acrylate represented by the formula (I)

wherein $R^1$ is hydrogen or a methyl group, and $R^2$ is an aliphatic hydrocarbon group, a cyclic aliphatic hydrocarbon group or a partially aromatic group-substituted aliphatic hydrocarbon group having 1 to 18 carbon atoms,
   (ii) not less than 0.4% by weight to less than 2% by weight of a basic nitrogen-containing monomer represented by the formula (II)

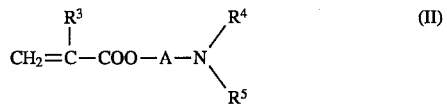

wherein $R^3$ is hydrogen or a methyl group; each of $R^4$ and $R^5$ is independently a methyl group or an ethyl group; and A is an alkylene group having 1 to 4 carbon atoms, and (iii) optionally, up to 5% by weight of a styrene monomer;

(b) a pigment containing titanium dioxide as the main component; and (c) a non-polar solvent containing 50% or less by weight of n-heptane, 2,2,4-trimethylpentane, or a mixture of n-heptane and 2,2,4-trimethylpentane.

2. A correction fluid composition according to claim 1 which comprises 5 to 15% by weight of the acrylic synthetic resin, 40 to 60% by weight of the pigment, and 25 to 55% by weight of a non-polar solvent containing 50% by weight or less of n-heptane, 2,2,4-trimethylpentane, or a mixture of n-heptane and 2,2,4-trimethylpentane.

3. A correction fluid composition according to claim 1 which comprises 5 to 15% by weight of the acrylic synthetic resin, 40 to 60% by weight of the pigment, and 25 to 55% by weight of a mixed solvent of methylcyclohexane and 2,2,4-trimethylpentane.

4. A correction fluid composition according to claim 1 which comprises 5 to 15% by weight of the acrylic synthetic resin, 40 to 60% by weight of the pigment, and 25 to 55% by weight of a mixed solvent of methylcyclohexane and n-heptane.

5. A correction fluid composition according to claim 1 which comprises 5 to 15% by weight of the acrylic synthetic resin, 40 to 60% by weight of the pigment, and 25 to 55% by weight of a mixed solvent of methylcyclohexane, ethylcyclohexane and n-heptane.

6. A correction fluid composition according to claim 1 which comprises 5 to 15% by weight of the acrylic synthetic resin, 40 to 60% by weight of the pigment, and 25 to 55% by weight of a mixed solvent of methylcyclohexane, ethylcyclohexane and n-heptane and 2,2,4-trimethylpentane.

7. A correction fluid composition according to claim 1 which comprises 5 to 15% by weight of the acrylic synthetic resin, 40 to 60% by weight of the pigment, and 25 to 55% by weight of a mixed solvent of methylcyclohexane and ethylcyclohexane.

* * * * *